United States Patent [19]

Pfohl et al.

[11] Patent Number: 4,880,497
[45] Date of Patent: Nov. 14, 1989

[54] PREPARATION OF WATER-SOLUBLE COPOLYMERS CONTAINING VINYLAMINE UNITS, AND THEIR USE AS WET STRENGTH AGENTS AND DRY STRENGTH AGENTS FOR PAPER

[75] Inventors: Sigberg Pfohl, Speyer; Michael Kroener, Mannheim; Heinrich Hartmann, Limburgerhof; Walter Denzinger, Speyer, all of Fed. Rep. of Germany

[73] Assignee: BASF Aktiengesellschaft, Ludwigshafen, Fed. Rep. of Germany

[21] Appl. No.: 187,929

[22] Filed: Apr. 29, 1988

Related U.S. Application Data

[62] Division of Ser. No. 907,222, Sep. 15, 1986, Pat. No. 4,774,288.

[30] Foreign Application Priority Data

Sep. 26, 1985 [DE] Fed. Rep. of Germany ....... 3534273

[51] Int. Cl.$^4$ .............................................. D21H 1/38
[52] U.S. Cl. ................................ 162/135; 162/168.2; 162/184; 427/391
[58] Field of Search ...................... 162/168.2, 135, 184; 427/391

[56] References Cited

U.S. PATENT DOCUMENTS 3,597,314  8/1971  Laube et al. ...................... 162/168.2
3,715,336  2/1973  Nowak et al. .
4,421,602  12/1983  Brunnmueller et al. ......... 162/168.2

*Primary Examiner*—Peter Chin
*Attorney, Agent, or Firm*—Oblon, Spivak, McClelland, Maier & Neustadt

[57] ABSTRACT

Water-soluble copolymers containing copolymerized vinylamine units are prepared by copolymerizing (a) from 95 to 10 mol % of N-vinylformamide and (b) from 5 to 90 mol % of an ethylenically unsaturated monomer from the group consisting of vinyl acetate, vinyl propionate, $C_1$–$C_4$-alkyl vinyl ethers, the esters, nitriles and amides of acrylic acid and methacrylic acid and N-vinylpyrrolidone, and then eliminating from 30 to 100 mol % of the formyl groups from the copolymer. Preferred copolymers are copolymers of N-vinylformamide and vinyl acetate, in which from 30 to 100 mol % of the monomer units are hydrolyzed. The copolymers are used in papermaking to increase the dry strength and wet strength of the paper.

8 Claims, No Drawings

PREPARATION OF WATER-SOLUBLE COPOLYMERS CONTAINING VINYLAMINE UNITS, AND THEIR USE AS WET STRENGTH AGENTS AND DRY STRENGTH AGENTS FOR PAPER

This is a division of application Ser. No. 907,222, filed Sept. 15, 1986 now U.S. Pat. No. 4,774,285.

U.S. Pat. No. 4,421,602 discloses partially hydrolyzed, water-soluble polymers of N-vinylformamide which contain N-vinylformamide units and vinylamine units. The polymers are used as agents for increasing the flocculation, retention and drainage rate in papermaking.

U.S. Pat. No. 4,255,548 discloses ethylene/vinylamine copolymers which are obtained by copolymerization of ethylene with N-vinylformamide and elimination of all formyl groups from the copolymer by the action of hydrochloric acid. Polymers of this type are, for example, flocculants for finely divided substances suspended in water.

U.S. Pat. No. 2,721,140 discloses that polyvinylamine hydrochloride can be used as a papermaking assistant, in particular paper having a high wet strength being obtained. However, the paper treated in this manner has a pronounced tendency to yellow.

It is an object of the present invention to provide a water-soluble copolymer which contains vinylamine units, has a long shelf life and, when used as a paper assistant, does not tend to have an adverse effect on the whiteness of the paper.

We have found that this object is achieved, according to the invention, if (a) from 95 to 10 mol% of N-vinylformamide are copolymerized with (b) from 5 to 90 mol% of an ethylenically unsaturated monomer from the group consisting of vinyl acetate, vinyl propionate, the $C_1$-$C_4$-alkyl vinyl ethers, N-vinylpyrrolidone, and the esters, nitriles and amides of acrylic acid and methacrylic acid and from 30 to 100, preferably from 70 to 95, mol% of the formyl groups are then eliminated from the copolymer. The copolymers obtained in this manner are used in paper-making to increase the dry strength and wet strength of the paper; the copolymers are added to the paper stock, prior to sheet formation, in an amount of from 0.1 to 5% by weight, based on the dry fibers, or are applied to the surface of the paper as an aqueous solution in the stated amount.

Particularly useful for this purpose are water-soluble copolymers of (a) from 95 to 10 mol% of N-vinylformamide and (b) from 5 to 90 mol% of vinyl acetate and/or vinylpropionate, from which 30–100 mol% of the formyl groups have been eliminated from the units (a) and 30–100 mol% of the acetyl or propionyl groups have been eliminated from the units (b) of the copolymer.

N-Vinylformamide ($CH_2=CH-NH-CHO$) can be prepared, for example, by the process described in German Published Application DAS 1,224,304. It can be copolymerized by a conventional polymerization method. Suitable comonomers (b) for this purpose are ethylenically unsaturated monomers from the group consisting of vinyl acetate, vinyl propionate, the $C_1$-$C_4$-alkyl vinyl ethers, and the esters, nitriles and amides of acrylic acid and methacrylic acid. Examples of useful alkyl vinyl ethers are methyl vinyl ether, ethyl vinyl ether, isopropyl vinyl ether, n-propyl vinyl ether, tert-butyl vinyl ether and n- and isobutyl vinyl ether. The monomers of group (b) also include acrylamide, methacrylamide, acrylonitrile, methacrylo-nitrile and esters of acrylic acid and methacrylic acid which are derived from alcohols of 1 to 18 carbon atoms. Examples of suitable alcohols for the preparation of these esters are methanol, ethanol, propanol, isopropanol, n-, iso- and tert-butyl alcohol, neopentyl alcohol, 2-ethyl-hexanol, n-octanol, dodecanol, palmityl alcohol and stearyl alcohol. Preferably used compounds from the group consisting of the esters are those derived from alcohols of 1 to 4 carbon atoms. These include esters which are prepared by esterifying a dihydric $C_2$-$C_4$-alcohol with acrylic acid or methacrylic acid in a molar ratio of 1:1, ie. hydroxyethyl acrylate, hydroxyethyl methacrylate, hydroxypropyl acrylates, hydroxypropyl methacrylates, hydroxybutyl acrylates and hydroxybutyl methacrylates. Another suitable monomer of group (b) is N-vinylpyrrolidone. The monomers of group (b) can be copolymerized either alone or as a mixture with N-vinylformamide. The copolymers contain from 95 to 10, preferably from 60 to 40, mol% of N-vinylformamide and from 5 to 90, preferably from 40 to 60, mol% of one or more monomers of group (b) as copolymerized units, the sum of the percentages in the copolymers always being 100. Of particular importance are copolymers of N-vinylformamide and the following monomers of group (b): vinyl acetate, vinyl propionate, $C_1$-$C_4$-alkyl vinyl ethers and N-vinylpyrrolidone.

The monomers (a) and (b) are polymerized using free radical polymerization initiators, for example peroxides, hydroperoxides, redox catalysts, or azo compounds which decompose to give free radicals. The polymerization is advantageously carried out in a solvent or diluent at from 30° to 140° C., under atmospheric, reduced or superatmospheric pressure. Polymers having a high molecular weight are obtained if the polymerization is carried out in water. This can be done, for example, for the preparation of water-soluble polymers in aqueous solution, as a water-in-oil emulsion or by the reverse suspension polymerization method. For the preparation of water-insoluble polymers, the oil-in-water emulsion polymerization method and the suspension polymerization method are used. The polymerization initiators are employed in the conventional amounts, for example from 0.1 to 5.0% by weight, based on the monomers. Particularly useful polymerization initiators are water-soluble azo compounds, eg. 2,2′-azo-bis-(2-amidinopropane) hydrochloride and 4,4′-azo-bis-(4′-cyanopentanoic acid).

The molecular weight of the copolymers can be influenced using polymerization regulators and chain extenders. Examples of suitable polymerization regulators are alcohols, such as methanol, ethanol and n- and isopropanol, acetone, hydroxylammonium salts, chlorohydrocarbons and thio compounds, such as thioglycolic acid, 2-mercaptoethanol and dodecyl mercaptan. Examples of suitable chain extenders are polyfunctional monomers, such as methylenebisacrylamide, divinyleneurea, pentaerythritol triallyl ether and divinylbenzene. Regulators and chain extenders are used, if required, in amounts of from 0.001 to 10, preferably from 0.01 to 5, % by weight, based on the monomers employed. Polymers having a low molecular weight may also be prepared, for example, by carrying out the polymerization in isopropanol using a polymerization initiator which is soluble therein. Where the polymerization is effected in an aqueous medium, the pH during the polymerization is from 4 to 10, preferably from 6 to 8. The amount of diluents or solvents used in the polymerization is chosen so that the polymer solutions, suspensions or dispersions obtained have a solids content of from 1 to 60, preferably from 3 to 30, % by weight.

The copolymers described above are modified by the action of acids or bases in such a way that, as a result of this treatment, the formyl groups are eliminated from the copolymerized N-vinylformamide with formation of vinylamine groups. Elimination of the formyl groups from the copolymer is preferably effected with hydrochloric acid or sodium hydroxide solution and can be carried out at from 20° to 100° C., as described in U.S. Pat. No. 4,421,602. If the formyl-containing copolymers are treated with hydrogen chloride or hydrogen bromide in the absence of water, an amino group is produced, with elimination of carbon monoxide from the N-formyl group of the copolymer. When acids or bases act on copolymers of N-vinylformamide and acrylonitrile, methacrylonitrile, N-vinylpyrrolidone and $C_1$–$C_4$-alkyl vinyl ethers, the monomers of group (b) in the copolymer undergo scarcely any chemical change, whereas from 30 to 100, preferably from 70 to 95, mol% of the copolymerized N-vinylformamide are hydrolyzed. Of particular importance are copolymers of N-vinylformamide and vinyl acetate and/or vinyl propionate. For example, the action of hydrochloric acid on these copolymers at 50° C. gives products in which the copolymerized acetate or vinyl propionate is not hydrolyzed, whereas from 30 to 100 mol% of the copolymerized N-vinylformamide may be hydrolyzed. If copolymers of N-vinylformamide and vinyl acetate or vinyl propionate are treated with sodium hydroxide solution at 50° C., the formyl groups are eliminated from the copolymerized N-vinylformamide and the acetyl or propionyl groups from the copolymerized vinyl acetate or vinyl propionate, about the same amount of groups being eliminated in each case.

The hydrolyzed copolymers, in which from 100 to 30, preferably from 70 to 95, % of the copolymerized N-vinylformamide units have been converted to vinylamine units and which have a Fikentscher K value of from 50 to 250, preferably from 100 to 200, are used in papermaking to increase the dry strength and wet strength of the paper. The hydrolyzed copolymers are preferably employed in aqueous solution and added to the paper stock, prior to sheet formation, in an amount of from 0.1 to 5% by weight, based on dry fiber. Copolymers in which 100% of the N-vinylformamide have been hydrolyzed and in which the monomer (b) is vinyl acetate or N-vinylpyrrolidone are preferably added to the paper stock during papermaking and greatly increase the wet strength of the paper. The aqueous polymer solutions may also be applied to the surface of the paper, the amounts used being from 0.1 to 5, preferably from 0.25 to 1, % by weight, based on dry fiber. The aqueous solutions of the copolymers are effective for all known grades of paper, board and cardboard, for example for making writing papers, printing papers and packaging papers. The papers or boards and cardboards may be produced from a large number of fiber materials and consist of, for example, sulfite or sulfate pulp (bleached or unbleached), ground wood or waste paper, or mixtures of the stated of fibers. The pH of the stock suspension is from 4 to 9, preferably from 6 to 8. The copolymers described above are preferably added to the paper stock suspension, prior to sheet formation, in an amount of from 0.25 to 1% by weight, based on dry fiber, and result in an increase in the dry strength and wet strength of the paper.

In the Examples which follow, parts and percentages are by weight. The K value of the polymers was determined according to H. Fikentscher, Cellulose-Chemie 13 (1932), 58–64 and 71–74, at 25° C. in a 5% strength aqueous sodium chloride solution at a polymer concentration of 0.5% by weight; $K = k.10^3$.

The paper sheets were produced in a Rapid-Kothen laboratory sheet former. The dry tear length was determined according to DIN 53,112, sheet 1, and the wet tear length according to DIN 53,112, sheet 2.

The alkali resistance was determined in the same way as the wet strength, except that, instead of water, a 1% strength sodium hydroxide solution was used to impregnate the papers (5 minutes at 50° C.). The whiteness of the paper sheets was determined with the aid of a reflectance photometer (Elrefo apparatus) according to DIN 53,145.

Preparation of the copolymers

EXAMPLE 1

In a stirred 2 liter pilot kettle provided with a thermometer, a condenser, a nitrogen inlet tube and two dropping funnels, a mixture of 600 g of water, 3 g of a copolymer of styrene and maleic anhydride in a molar ratio of 1:1, which has a weight average molecular weight of 150,000 and is in the form of a 30% strength aqueous solution of the Na salt, 1.5 g of sodium pyrophosphate, 27 g of vinyl acetate, 18 g of N-vinylformamide and 0.1 g of 2,2-azobis-(2,4-dimethylvaleronitrile) is heated to 65° C. After the polymerization has begun, 243 g of vinyl acetate, 0.9 g of 2,2-azobis-(2,4-dimethylvaleronitrile) and 162 g of N-vinylformamide are added in the course of 3 hours and the temperature is kept at 65° C. After the addition of the monomers, the mixture is kept at 75° C. for a further 2 hours, after which it is diluted with 300 g of water, 0.2 g of 2,2-azobisisobutyronitrile is added and polymerization is then continued for a further 3 hours at from 65° to 82° C. Thereafter, a further 0.2 g of 2,2-azobisisobutyronitrile is added and the mixture is heated at the boil, the maximum internal temperature in the final stage being 98° C. A highly viscous, homogeneous white paste of a copolymer of 60% of vinyl acetate and 40% of N-vinylformamide is formed.

Hydrolysis

The above copolymer of 40% of N-vinylformamide and 60% of vinyl acetate, in the form of a 20% strength aqueous suspension, is initially taken in a flask provided with a stirrer, and 38% strength hydrochloric acid is added dropwise. 2 moles of hydrochloric acid are used per mole of N-vinylformamide in the copolymer. Hydrolysis is carried out at 60° C. in the course of 6 hours, 100 mol% of the copolymerized N-vinyl-formamide and 90 mol% of the copolymerized vinyl acetate being hydrolyzed. An aqueous solution having a viscosity of 600 mPa.s at 20° C. and a solids content of 12.2% by weight is obtained, and the K value of the copolymer is 100.

EXAMPLE 2

The method described in Example 1 is used to prepare a copolymer of 60% of N-vinylformamide and 40% of vinyl acetate, the said copolymer being obtained as a highly viscous, white paste. The polymer concentration in the paste is 26.2%. 1 mole of a 38% strength hydrochloric acid per mole of N-vinylformamide in the copolymer is then added to the paste in a flask provided with a stirrer, after which the mixture is heated at 60° C. for 4 hours. After this time, 90 mol% of the copolymerized N-vinylformamide and 80 mol% of the copolymerized vinyl acetate is found to be hydrolyzed. The viscosity of the resulting 17.9% strength polymer solution is 3,750 mPa.s, and the K value of the copolymer is 150.

EXAMPLES OF USE

EXAMPLE 3

A 0.5% strength stock suspension in water is prepared from 50% of pine sulfite pulp and 50% of beech sulfite pulp. The pH of the suspension is 7.5 and the freeness is 30° SR. The stock suspension is divided into four equal parts, and each part is processed to sheets having a basis weight of 80 g/m$^2$, under the following conditions:

(a) nothing is added to the stock suspension.

(b) 1%, based on the solids, of an aqueous solution of a commercial neutral wet strength resin based on a reaction product of epichlorohydrin and a polyamidoamine obtained from diethylenetriamine and adipic acid is added to the stock suspension. The said resin is prepared as described in Example 1 of U.S. Pat. No. 2,926,116.

(c) 1%, based on the solids, of an aqueous solution of a polyvinylamine hydrochloride (K value 95) according to U.S. Pat. No. 2,721,140 is added to the stock suspension.

(d) 1%, based on the solids, of the hydrolyzed copolymer obtained as described in Example 1 is added to the stock suspension.

The dry tear length, the wet tear length and the whiteness of the four sheets obtained as described in (a) to (d) are tested. The results are summarized in Table 1.

TABLE 1

|  | (a) | (b) | (c) | (d) (according to the invention) |
|---|---|---|---|---|
| Dry tear length (m) | 2,380 | 2,990 | 2,850 | 3,100 |
| Wet tear length (m) of unaged paper | 0 | 720 | 670 | 810 |
| Wet tear length (m) of paper aged for 5 minutes at 110° C. | 0 | 920 | 850 | 940 |
| Whiteness (% reflectance) | 87.0 | 79.4 | 75.2 | 80.4 |

EXAMPLE 4

A 0.5% strength stock suspension in water is prepared from 100% strength pine sulfite pulp. The pH of the suspension is 7.5 and the freeness is 35° SR. The stock suspension is divided into four equal parts, and each part is processed to sheets having a basis weight of 80 g/m$^2$, under the following conditions:

(a) Nothing is added to the stock suspension.

(b) 1%, based on the solids, of an aqueous solution of a commercial neutral wet strength resin based on a reaction product of epichlorohydrin and a polyamidoamine obtained from diethylenetriamine and adipic acid is added to the stock suspension. The said resin is prepared as described in Example 1 of U.S. Pat. No. 2,926,116.

(c) 1%, based on the solids, of an aqueous solution of a polyvinylamine hydrochloride (K value 95) according to U.S. Pat. No. 2,721,140 is added to the stock suspension (the pH is brought to 6 with sodium hydroxide solution).

(d) 1%, based on the solids, of the hydrolyzed copolymer described in Example 2 is added to the stock suspension.

The dry tear length, the wet tear length, the alkali resistance and the whiteness of the four sheets obtained as described in (a) to (d) are tested. The results are summarized in Table 2.

TABLE 2

|  | (a) | (b) | (c) | (d) (according to the invention) |
|---|---|---|---|---|
| Dry tear length (m) | 4,350 | 4,950 | 5,300 | 5,450 |
| Wet tear length (m) of unaged paper | 0 | 940 | 950 | 1,100 |
| Wet tear length (m) of paper aged for 5 minutes at 110° C. | 0 | 1,350 | 1,120 | 1,300 |
| Alkali resistance (m), 1% strength sodium hydroxide solution for 5 minutes at 50° C., unaged paper | 0 | 690 | 890 | 970 |
| Alkali resistance (m) 1% strength sodium hydroxide solution for 5 minutes at 50° C., paper aged for 5 minutes at 110° C. | 0 | 840 | 975 | 1,090 |
| Whiteness | 79.7 | 72.0 | 69.5 | 72.5 |

We claim:

1. A process for making paper which has high dry strength and wet strength, comprising applying a hydrolyzed copolymer to a paper sheet, wherein said hydrolyzed copolymer is prepared by a process, comprising:

(i) copolymerizing (a) N-vinylformamide in an amount of from 95 to 10 mole % with (b) an ethylenically unsaturated monomer selected from the group consisting of vinyl acetate, vinyl propionate, the C$_1$–C$_4$-alkyl vinyl ethers, N-vinylpyrrolidone, and the esters, nitriles, and amides of acrylic acid and methacrylic acid in an amount of from 5 to 90 mole % to give a copolymer with formyl groups; and (ii) hydrolyzing from 30 to 100 mole % of said formyl groups of said copolymer to form a hydrolyzed copolymer with amino groups;

wherein said hydrolyzed copolymer is applied to said paper sheet in an amount of from 0.1 to 5% by weight, based on dry fiber.

2. The process of claim 1, wherein said hydrolyzed copolymer is prepared by copolymerizing from 60 to 40 mole % of said N-vinylformamide with from 40 to 60 mole % of said ethylenically unsaturated monomer.

3. The process of claim 1, wherein said hydrolyzed copolymer is prepared by hydrolyzing from 70 to 95% of said formyl groups to said amino groups.

4. The process of claim 1, wherein said ethylenically unsaturated monomer is selected from the group consisting of vinyl acetate and vinyl propionate and said copolymer has ester groups.

5. The process of claim 4, wherein said hydrolyzed copolymer is prepared by hydrolyzing from 70 to 95 mole % of said formyl groups to said amino groups and from 70 to 95 mole % of said ester groups to hydroxy groups.

6. The process of claim 1, wherein said applying step comprises coating said paper sheet with an aqueous solution of said hydrolyzed copolymer.

7. The process of claim 1, wherein said paper sheet comprises one or more fiber materials selected from the group consisting of ground wood, waste paper, sulfite pulp, and sulfate pulp.

8. The process of claim 1, wherein said applying step comprises coating said paper sheet with said hydrolyzed copolymer in an amount of from 0.25 to 1% by weight, based on dry fiber.

* * * * *